Figure 1:
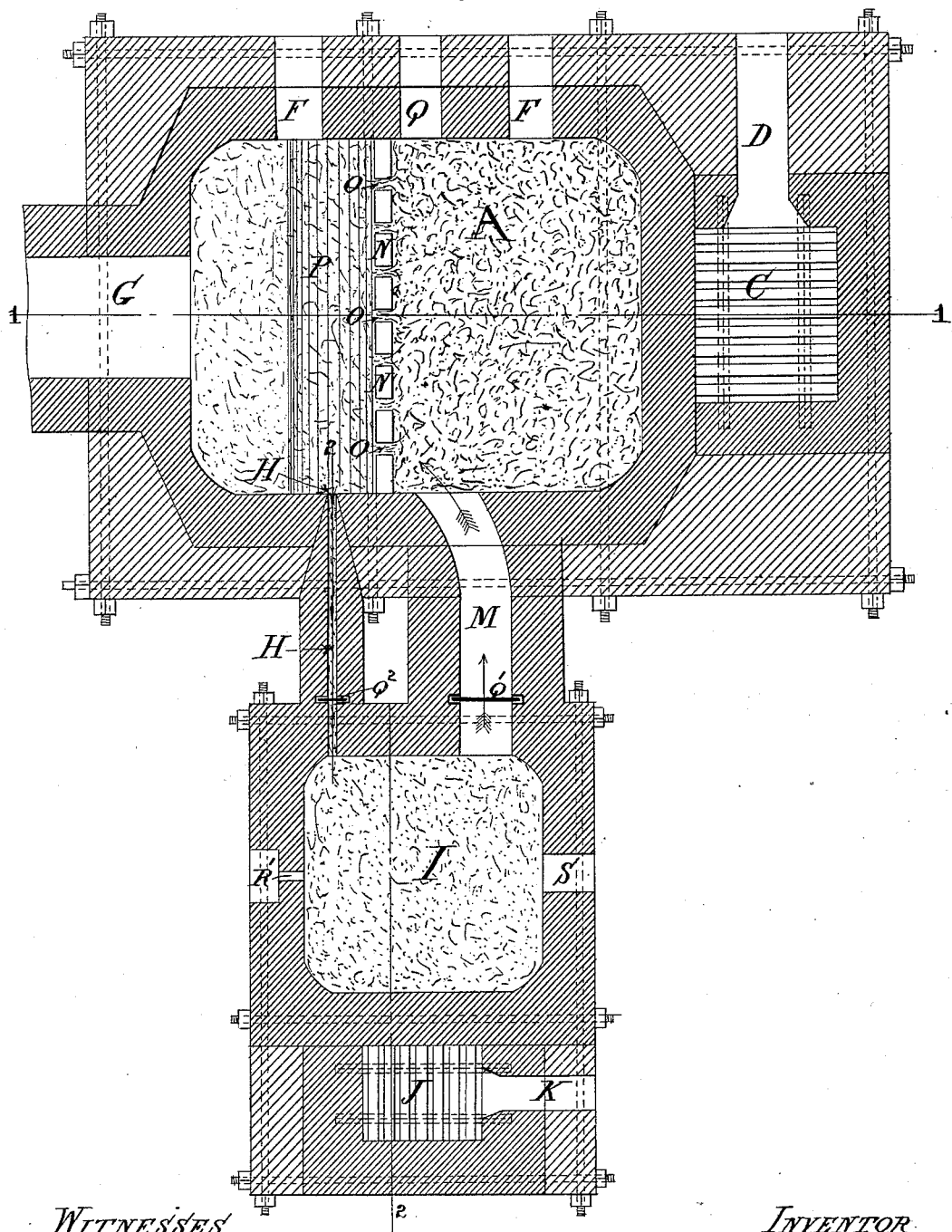

(No Model.) 2 Sheets—Sheet 1.

R. BONEHILL.

FURNACE FOR SMELTING AND REDUCING METALS FROM MINERALS.

No. 359,199. Patented Mar. 8, 1887.

WITNESSES
S. L. Schrader.
Edwin Sauter

INVENTOR
Robert Bonehill
Paul Bakewell
attorney

N. PETERS. Photo-Lithographer, Washington, D. C.

(No Model.) 2 Sheets—Sheet 2.
R. BONEHILL.
FURNACE FOR SMELTING AND REDUCING METALS FROM MINERALS.
No. 359,199. Patented Mar. 8, 1887.
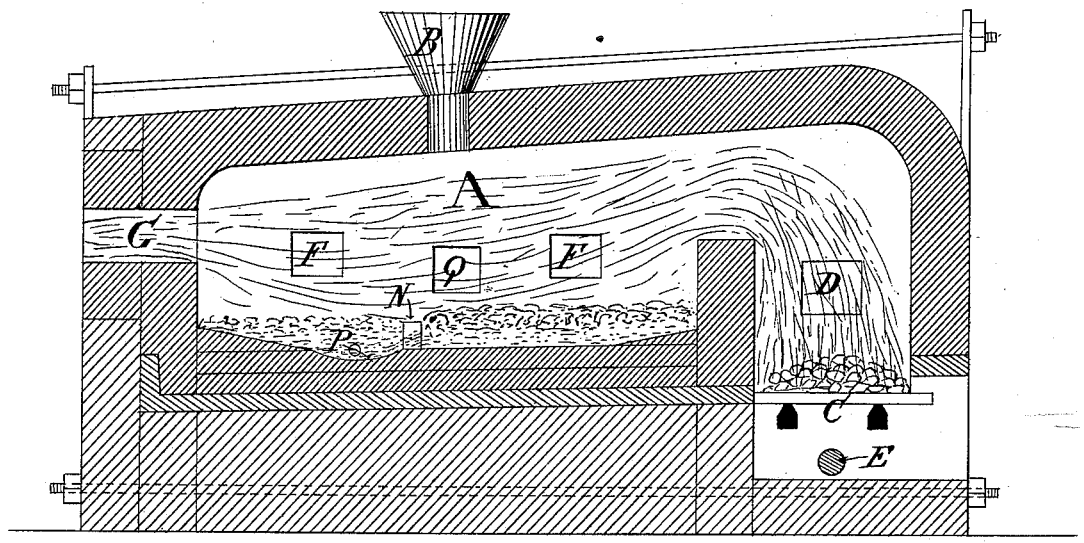
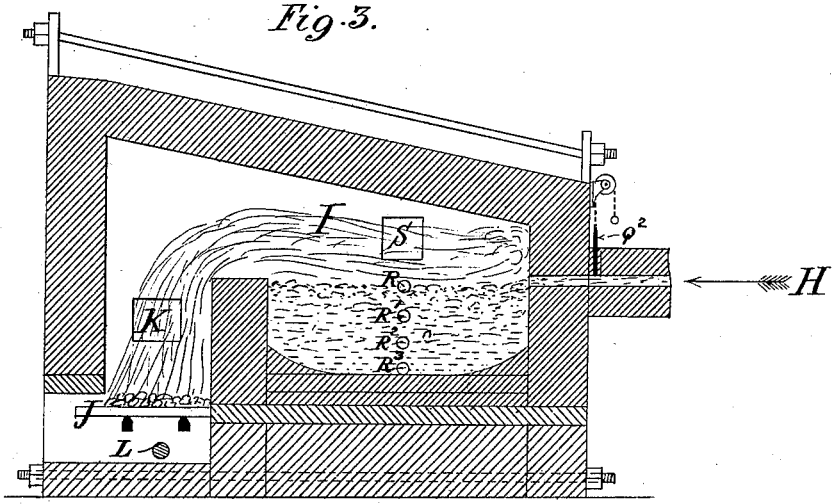
WITNESSES
S. L. Schrader
Edwin Sauter
INVENTOR
Robert Bonehill
Paul Bakewell
attorney

UNITED STATES PATENT OFFICE.

ROBERT BONEHILL, OF ST. LOUIS, MISSOURI, ASSIGNOR OF FIVE-EIGHTHS TO WILLIAM VERNON, OF DERBYSHIRE, ENGLAND, AND JOHN M. FROST, JAMES HENRY, AND FRANCIS D. HIRSCHBERG, ALL OF ST. LOUIS, MO.

FURNACE FOR SMELTING AND REDUCING METALS FROM MINERALS.

SPECIFICATION forming part of Letters Patent No. 359,199, dated March 8, 1887.

Application filed August 12, 1886. Serial No. 210,692. (No model.) Patented in Belgium March 15, 1883, No. 60,775.

*To all whom it may concern:*

Be it known that I, ROBERT BONEHILL, a citizen of France, temporarily residing at the city of St. Louis, State of Missouri, have invented a certain new and useful Improvement in Furnaces for Smelting and Reducing Metals from Minerals, of which the following is a full, clear, and exact description.

My invention relates to improvements in the construction and arrangement of furnaces for the smelting and reduction from minerals, of copper, silver, and other metals, and has for its object to obtain the pure metal after the first fusion of the minerals, instead of after a series of fusions in separate reverberatory furnaces, as necessary by the systems in present use.

On the accompanying drawings, Figure 1 is a sectional plan representing my improved smelting and reducing furnace; Fig. 2, a section on line 1 1, and Fig. 3, a section, partly broken away, on line 2 2 in Fig. 1, like letters of reference denoting like parts in all the figures.

A represents a reverberatory furnace, which is charged with the mineral to be treated through hopper B, and is provided with the fire-grate C, to which fuel is fed through the hole D.

E is the entrance for the blast, F F the doors or openings through which the materials in the furnace A are worked, and G the exit-flue for the waste products of combustion from the furnace A to the chimney.

The minerals in the furnace A, after being brought to a highly-molten state, are caused to run off through a conduit, H, into a purifying-basin or auxiliary furnace, I, having a square or other suitable shape, and provided with fire-grate J, to which fuel is fed through the hole K.

L is the entrance for the blast, whereby the temperature of the purifying basin or furnace I may be maintained at a considerably higher temperature than that of the reverberatory furnace A. The waste products of combustion in the furnace I, derived from the grate J, combined with those from the heated gases evolved from the inflowing mineral, are returned to the reverberatory furnace A through the connecting-flue M, and thence escape through flue G to the chimney. Extending across and projecting upward to a suitable distance from the inclined floor of the reverberatory furnace A toward its rear end is a ridge of brick-work, N, through which in the line of the furnace A are formed slots or openings O. Immediately behind or at the rear side of the brick-work ridge N the floor of the furnace A is formed longitudinally to a short distance with a concave depression or trench, P, at one end of which over its lower part is located the mouth of the conduit H, leading to the purifying basin or furnace I. By this arrangement the molten mineral in the reverberatory furnace A while flowing toward the conduit H is constrained to pass through the slots or openings O in the brick-work ridge N, and is thereby drained, as it were, of its grosser and heavier impurities, which are kept back by the solid portions of the ridge N between the openings O, and the metal so partly purified flowing to and being collected in the concave depression or trench P, its passage through the conduit H into the purifying-basin I is thereby greatly facilitated.

Through the side and opening on a level with the bottom of the reverberatory furnace A, in the immediate neighborhood of the brick-work ridge N, is an inclined hole or passage, Q, through which coke is charged into the furnace A for purifying purposes, and through which the furnace A may be cleansed.

$Q'$ $Q^2$ are dampers to the flue M and conduit H, respectively, for regulating the heat between the furnaces A and I.

The liquid metal when received into the purifying-basin or auxiliary furnace I is subjected to the following purifying treatment: R $R'$ $R^2$ $R^3$ are holes formed through the wall of the furnace I at various heights, and normally closed or tamped with clay or other luting until the materials in the furnace I are in a sufficiently heated and liquid condition, when the mass is puddled or worked through hole S and its slag or impurities withdrawn, in the first instance through the highest hole, R. This process is repeated at the level of each hole $R'$ $R^2$, thus successively lowering the surface of the metal and allowing the pure metal to settle at the bottom of the furnace I, where it is finally tapped and withdrawn through the bottom hole, R³, into suitable molds.

By this invention, the metal being purified during the first fusion, its production is effected with greater rapidity and far less expenditure of fuel and labor than by the ordinary process.

I am aware that furnaces having two or more chambers commuicating with each other for reducing and refining metals are not new, and I do not desire to claim the same, broadly.

I claim—

1. In a furnace for smelting and reducing minerals, the reverberatory hearth A and fire-place C, in combination with the auxiliary hearth I and fire-place J, conduit H, and connecting flue M, substantially as shown, and for the purpose described.

2. In a furnace for smelting and reducing minerals, the reverberatory hearth A and fire-place C, in combination with the auxiliary hearth I and fire-place J, and conduit H, leading from the chamber of the hearth A to the chamber of the hearth I, substantially as shown, and for the purpose described.

3. In a furnace for smelting and reducing minerals, the reverberatory hearth A and fire-place C, having brick-work ridge N, formed with slots or openings O and concave depression or trench P, in combination with conduit H, and auxiliary hearth I and fire-place J, substantially as shown, and for the purpose described.

4. The combination of the reducing-furnace A, having the ridge-wall N, an auxiliary refining-furnace, I, and the conduit H, and flue M, connecting the furnaces A, and I, substantially as and for the purpose specified.

In testimony whereof I affix my signature, in presence of two witnesses, this 6th day of August, 1886.

ROBERT BONEHILL.

Witnesses:
S. L. SCHRADER,
PAUL BAKEWELL.